(12) United States Patent
Seok (10) Patent No.: US 9,344,312 B2
(45) Date of Patent: May 17, 2016

(54) METHOD AND APPARATUS FOR MULTIPLE FRAME TRANSMISSION FOR SUPPORTING MU-MIMO

(75) Inventor: Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 79 days.

(21) Appl. No.: 13/392,216

(22) PCT Filed: Jul. 12, 2010

(86) PCT No.: PCT/KR2010/004502
§ 371 (c)(1),
(2), (4) Date: Feb. 24, 2012

(87) PCT Pub. No.: WO2011/025146
PCT Pub. Date: Mar. 3, 2011

(65) Prior Publication Data
US 2012/0170565 A1 Jul. 5, 2012

Related U.S. Application Data

(60) Provisional application No. 61/236,887, filed on Aug. 26, 2009, provisional application No. 61/245,656, filed on Sep. 24, 2009.

(51) Int. Cl.
*H04W 4/00* (2009.01)
*H04L 27/26* (2006.01)
(Continued)

(52) U.S. Cl.
CPC ............ *H04L 27/2602* (2013.01); *H04L 69/22* (2013.01); *H04W 28/18* (2013.01); *H04W 84/12* (2013.01)

(58) Field of Classification Search
CPC .................................................. H04W 84/12

USPC ......... 370/335, 336, 338, 349, 389, 470, 310, 370/312, 328; 714/749
See application file for complete search history.

(56) References Cited

U.S. PATENT DOCUMENTS

2005/0015703 A1    1/2005   Terry et al.
2005/0053066 A1*   3/2005   Famolari ...................... 370/389
(Continued)

FOREIGN PATENT DOCUMENTS

CN    101197652 A    6/2008
CN    101268660 A    9/2008
(Continued)

OTHER PUBLICATIONS

Gross et al., "Multi-User OFDMA Frame Aggregation for Future Wireless Local Area Networking", Proc. of IFIP Networking 2009, May 2009, 12 pages.
(Continued)

*Primary Examiner* — Gregory Sefcheck
*Assistant Examiner* — Jael Ulysse
(74) *Attorney, Agent, or Firm* — Birch, Stewart, Kolasch & Birch, LLP (57) ABSTRACT

A method of transmitting multiple frames in a wireless local area network (WLAN) system supporting multi user-multiple input multiple output (MU-MIMO) is provided. The method comprises transmitting a first frame and a second frame consecutively to a first station (STA) and transmitting a third frame and a fourth frame consecutively to a second STA, wherein a transmission start time of the first frame and a transmission start time of the third frame are aligned to each other, and wherein a transmission start time of the second frame and a transmission start time of the fourth frame are aligned to each other.

8 Claims, 6 Drawing Sheets

(51) Int. Cl.
*H04L 29/06* (2006.01)
*H04W 28/18* (2009.01)
*H04W 84/12* (2009.01)

(56) References Cited

U.S. PATENT DOCUMENTS

| | | | |
|---|---|---|---|
| 2006/0056362 A1* | 3/2006 | Jang | H04L 47/10 370/336 |
| 2006/0189352 A1* | 8/2006 | Nagai et al. | 455/561 |
| 2007/0053354 A1* | 3/2007 | Rudolf | H04L 9/0833 370/389 |
| 2007/0060139 A1* | 3/2007 | Kim et al. | 455/445 |
| 2007/0104150 A1* | 5/2007 | Fernandez-Corbaton | H04B 1/7107 370/335 |
| 2007/0147284 A1* | 6/2007 | Sammour | H04J 3/0605 370/328 |
| 2007/0186134 A1* | 8/2007 | Singh | H04L 1/1614 714/749 |
| 2007/0204052 A1* | 8/2007 | Trainin et al. | 709/230 |
| 2007/0230493 A1* | 10/2007 | Dravida et al. | 370/412 |
| 2008/0002794 A1* | 1/2008 | Wallace et al. | 375/347 |
| 2008/0045153 A1* | 2/2008 | Surineni et al. | 455/63.1 |
| 2008/0123620 A1* | 5/2008 | Ko et al. | 370/349 |
| 2008/0130538 A1* | 6/2008 | Raissinia et al. | 370/310 |
| 2008/0159190 A1* | 7/2008 | Tsao | 370/310 |
| 2008/0287069 A1* | 11/2008 | Yoshimura | 455/69 |
| 2008/0293398 A1* | 11/2008 | Seyama | H04J 11/0083 455/422.1 |
| 2009/0059877 A1* | 3/2009 | Utsunomiya et al. | 370/338 |
| 2009/0063804 A1* | 3/2009 | Trainin | 711/170 |
| 2009/0196364 A1* | 8/2009 | Nakajima | H04W 28/065 375/260 |
| 2009/0262677 A1* | 10/2009 | Banerjea et al. | 370/312 |
| 2009/0316725 A1* | 12/2009 | Frederiks et al. | 370/470 |
| 2010/0046437 A1 | 2/2010 | Nishibayashi et al. | |
| 2010/0050054 A1* | 2/2010 | Abraham | H04L 1/0072 714/776 |
| 2010/0146351 A1* | 6/2010 | Kakani et al. | 714/746 |
| 2012/0236789 A1* | 9/2012 | Dravida | H04L 47/14 370/328 |
| 2014/0112230 A1 | 4/2014 | Sammour et al. | |

FOREIGN PATENT DOCUMENTS

| | | |
|---|---|---|
| EP | 1699249 A1 | 9/2006 |
| JP | 2006-54673 A | 2/2006 |
| JP | 2007-215244 A | 8/2007 |
| JP | 2008-288719 A | 11/2008 |
| JP | 2009-10628 A | 1/2009 |
| JP | 2009-509469 A | 3/2009 |
| JP | 2009-164751 A | 7/2009 |
| JP | 2009-532954 A | 9/2009 |
| RU | 2313912 C2 | 12/2007 |
| WO | WO 03/023587 A2 | 3/2003 |
| WO | WO 2004/102889 A1 | 11/2004 |
| WO | WO 2007/038118 A2 | 4/2007 |
| WO | WO 2007/115199 A2 | 10/2007 |
| WO | WO 2009/061110 A1 | 5/2009 |

OTHER PUBLICATIONS

Skordoulis et al., "IEEE 802.11N MAC Frame Aggregation Mechanisms for Next-Generation High-Throughput WLANs," Medium Access Control Protocols for Wireless LANs, IEEE Wireless Communications, Feb. 2008, pp. 40-47.

* cited by examiner

METHOD AND APPARATUS FOR MULTIPLE FRAME TRANSMISSION FOR SUPPORTING MU-MIMO

CROSS REFERENCE TO RELATED APPLICATIONS

This application is the National Phase of PCT/KR2010/004502 filed on Jul. 12, 2010, which claims the benefit under 35 U.S.C. 119(e) of U.S. Provisional Application Nos. 61/236,887 filed on Aug. 26, 2009 and 61/245,656 filed Sep. 24, 2009, all of which are hereby expressly incorporated by reference into the present application.

TECHNICAL FIELD

The present invention relates to wireless communications, and more particularly, to a method of transmitting multiple frames in a wireless local area network (WLAN) system supporting multi-user multiple input multiple output (MU-MIMO) and a wireless apparatus supporting the method.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

Ever since the institute of electrical and electronics engineers (IEEE) 802, i.e., a standardization organization for WLAN technologies, was established in February 1980, many standardization works have been conducted. In the initial WLAN technology, a frequency of 2.4 GHz was used according to the IEEE 802.11 to support a data rate of 1 to 2 Mbps by using frequency hopping, spread spectrum, infrared communication, etc. Recently, the WLAN technology can support a data rate of up to 54 Mbps by using orthogonal frequency division multiplex (OFDM). In addition, the IEEE 802.11 is developing or commercializing standards of various technologies such as quality of service (QoS) improvement, access point protocol compatibility, security enhancement, radio resource measurement, wireless access in vehicular environments, fast roaming, mesh networks, inter-working with external networks, wireless network management, etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate. In addition, this standard may use a coding scheme which transmits several duplicate copies to increase data reliability and also may use the OFDM to support a higher data rate.

With the widespread use of the WLAN and the diversification of applications using the WLAN, there is a recent demand for a new WLAN system to support a higher throughput than a data processing rate supported by the IEEE 802.11n. However, an IEEE 802.11n medium access control (MAC)/physical layer (PHY) protocol is not effective to provide a throughput of above 1 Gbps. This is because the IEEE 802.11n MAC/PHY protocol is designed for an operation of a station (STA), that is, an STA having one network interface card (NIC), and thus when a frame throughput is increased while conforming to the conventional IEEE 802.11n MAC/PHY protocol, a resultant additional overhead is also increased. Consequently, there is a limitation in increasing a throughput of a wireless communication network while conforming to the conventional IEEE 802.11n MAC/PHY protocol, that is, a single STA architecture.

Therefore, to achieve a data processing rate of above 1 Gbps in the wireless communication system, a new system different from the conventional IEEE 802.11n MAC/PHY protocol (i.e., the single STA architecture) is required. A very high throughput (VHT) WLAN system is a next version of the IEEE 802.11n WLAN system, and is one of IEEE 802.11 WLAN systems which have recently been proposed to support a data processing rate of above 1 Gbps in a MAC service access point (SAP).

The VHT WLAN system allows simultaneous channel access of a plurality of VHT STAs for the effective use of a radio channel. For this, a multi-user multiple input multiple output (MU-MIMO)-based transmission using multiple antennas is supported. The VHT AP can perform spatial division multiple access (SDMA) transmission for transmitting spatially multiplexed data to the plurality of VHT STAs.

However, when frames are simultaneously transmitted to a plurality of STAs in a WLAN system supporting MU-MIMO, an amount of data to be transmitted to each STA may differ, and thus synchronization may not be maintained between STAs. As a result, efficiency in the use of radio resources decreases and complexity of the STA increases, which leads to increase in implementation costs. Such a problem may become more apparent when multiple frames are transmitted for each of the plurality of STAs. Accordingly, there is a need to consider a frame transmission method capable of solving this problem.

SUMMARY OF INVENTION

Technical Problem

The present invention provides a method of transmitting multiple frames in a wireless local area network (WLAN) system supporting multi-user multiple input multiple output (MU-MIMO).

The present invention also provides a method of transmitting multiple frames in a WLAN system supporting MU-MIMO and a wireless apparatus supporting the method.

Solution to Problem

In an aspect of the present invention, a method of transmitting multiple frames in a wireless local area network (WLAN) system supporting multi user-multiple input multiple output (MU-MIMO) includes transmitting a first frame and a second frame consecutively to a first station (STA), and transmitting a third frame and a fourth frame consecutively to a second STA, wherein a transmission start time of the first frame and a transmission start time of the third frame are aligned to each other, and wherein a transmission start time of the second frame and a transmission start time of the fourth frame are aligned to each other.

A length of the first frame and a length of the third frame may be adjusted to the same length by padding null data to a shorter frame between the first frame and the third frame by a difference between the length of the first frame and the length of the third frame.

The first frame and the third frame may have an aggregate MAC protocol data unit (A-MPDU) format.

Each of A-MPDU subframes constituting the first frame may include a null bit for indicating whether a follow-up A-MPDU subframe is null data.

If the null bit indicates that an A-MPDU subframe following the A-MPDU subframe comprising the null bit is null data, the first STA may discard the A-MPDU subframe following the A-MPDU subframe comprising the null bit.

In another aspect of the present invention, a method of transmitting multiple frames, performed by an access point (AP), in a WLAN system supporting MU-MIMO includes transmitting a first frame and a second frame consecutively to a first STA, and transmitting a third frame and a fourth frame consecutively to a second STA, wherein a transmission start time of the first frame and a transmission start time of the third frame are aligned to each other, and wherein an interval between the first frame and the second frame and an interval between the third frame and the fourth frame are set to a multiple of an orthogonal frequency division multiplex (OFDM) symbol duration.

The OFDM symbol duration may be 4 µs.

The first STA and the second STA may receive inter-frame space (IFS) configuration information from the AP, and in the IFS configuration information, the interval between the first frame and the second frame and the interval between the third frame and the fourth frame may be set to a multiple of the OFDM symbol duration.

The IFS configuration information may be transmitted to the first STA and the second STA by using a beacon frame.

In still another aspect of the present invention, an AP for transmitting multiple frames includes a transceiver for transmitting the multiple frames, and a processor operationally coupled to the transceiver, wherein the processor transmits a first frame and a second frame consecutively to a first STA, transmits a third frame and a fourth frame consecutively to a second STA, aligns a transmission start time of the first frame and a transmission start time of the third frame to each other, and aligns a transmission start time of the second frame and a transmission start time of the fourth frame to each other.

Advantageous Effects of Invention

According to the present invention, an overhead is reduced in multiple frame transmission. Therefore, radio resources are more effectively used, and complexity of a wireless apparatus is decreased, thereby being able to save implementation costs.

MODE FOR THE INVENTION

Hereinafter, exemplary embodiments of the present invention will be described with reference to the accompanying drawings.

A wireless local area network (WLAN) system according to an embodiment of the present invention includes at least one basic service set (BSS). The BSS is a set of stations (STAs) successfully synchronized to communicate with one another. The BSS can be classified into an independent BSS (IBSS) and an infrastructure BSS.

The BSS includes at least one STA and an access point (AP). The AP is a functional medium for providing a connection to STAs in the BSS through respective wireless media. The AP can also be referred to as other terminologies such as a centralized controller, a base station (BS), a scheduler, etc.

The STA is any functional medium including a medium access control (MAC) and wireless-medium physical layer (PHY) interface satisfying the IEEE 802.11 standard. The STA may be an AP or a non-AP STA. Hereinafter, the STA refers to the non-AP STA unless specified otherwise. The STA may also be referred to as other terminologies such as a user equipment (UE), a mobile station (MS), a mobile terminal (MT), a handheld device, an interface card, etc.

The STA can be classified into a VHT-STA, an HT-STA, and a legacy (L)-STA. The HT-STA is an STA supporting IEEE 802.11n. The L-STA is an STA supporting a previous version of IEEE 802.11n, for example, IEEE 802.11a/b/g. The L-STA is also referred to as a non-HT STA.

Hereinafter, transmission from the AP to the STA will be referred to as downlink transmission, and transmission from the STA to the AP will be referred to as uplink transmission. Further, transmission of spatial division multiple access (SDMA) data spatially multiplexed with respect to a plurality of STAs will be referred to as SDMA transmission. Although a downlink transmission scenario will be described as an example hereinafter for convenience of explanation, a multiple frame transmission method proposed in the present invention can also equally apply to an uplink transmission scenario.

Figure 1:
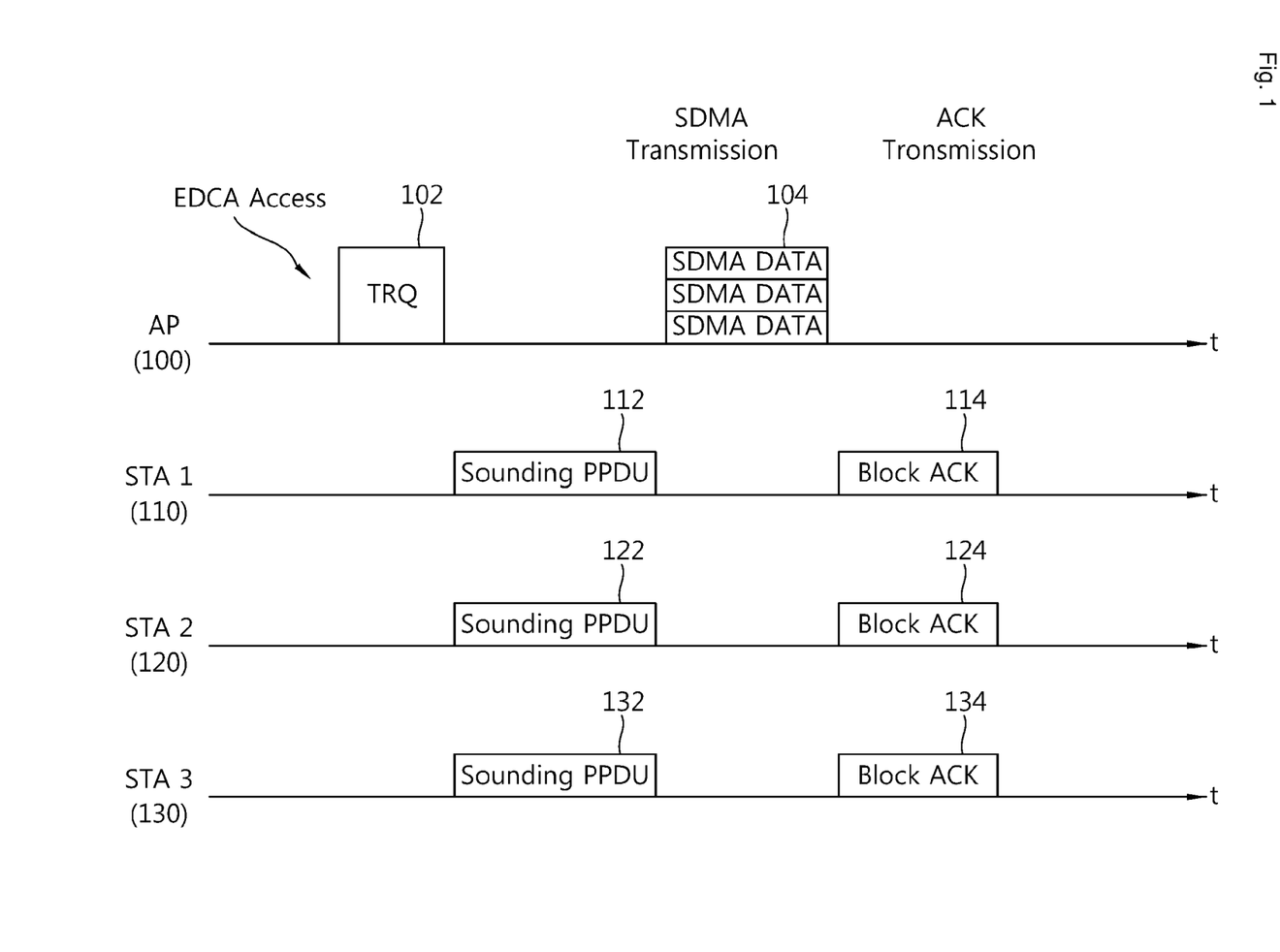
FIG. 1 shows an example of frame transmission using a multi user-multiple input multiple output (MU-MIMO) scheme.

FIG. 1 shows an example of frame transmission using a multi user-multiple input multiple output (MU-MIMO) scheme.

In the example of FIG. 1, an AP 100 transmits SDMA data 104 spatially multiplexed with respect to an STA_1 110, an STA_2 120, and an STA_3 130 by using the MU-MIMO scheme.

A plurality of physical layer convergence procedure (PLCP) protocol data units (PPDUs) may be used as a data frame to be transmitted for each of the STA_1 110, the STA_2 120, and the STA_3 130. When the plurality of PPDUs are consecutively transmitted by the AP with an interval of a short inter-frame space (SIFS) or a reduced inter-frame spacing (RIFS), it will be hereinafter referred to as multiple frame transmission.

To perform channel estimation with respect to a target STA for which SDMA transmission is to be performed, the AP 100 transmits a training request (TRQ) frame 102 before SDMA transmission. The TRQ frame 102 may include information indicating the target STA of SDMA transmission and information indicating a transmission duration. Upon receiving the TRQ frame 102, an STA determines whether the STA itself is the target STA of SDMA transmission by using the information which indicates the target STA of SDMA transmission and which is included in the TRQ frame 102. If it is not the target STA, the STA may set a network allocation vector (NAV) on the basis of information indicating the transmission duration so as to defer channel access during the transmission duration.

If it is determined that the STA is the target STA, the STA transmits to the AP a sounding PPDU used for channel estimation with respect to a specific STA. In the example of FIG. 1, the STA_1 110, the STA_2 120, and the STA_3 130 are target STAs, and transmit to the AP 100 a sounding PPDU 112, a sounding PPDU 122, and a sounding PPDU 132, respectively.

Upon receiving the sounding PPDU 112, the sounding PPDU 122, and the sounding PPDU 132, the AP 100 performs channel estimation by using the received sounding PPDUs. Thereafter, on the basis of the channel estimation result, the AP transmits the SDMA data 104 to the STA_1 110, the STA_2 120, and the STA_3 130 in SDMA transmission.

The STA_1 110, the STA_2 120, and the STA_3 130 receive the SDMA data 104, and as an acknowledgement (ACK), transmit a block ACK 114, a block ACK 124, and a block ACK 134 to the AP.

In this case, an amount of data to be transmitted by the AP 100 to the STA_1 110, the STA_2 120, and the STA_3 130 may be different among the STAs. In other words, data frames each having a different length may be simultaneously transmitted to the STA_1 110, the STA_2 120, and the STA_3 130, respectively. In this case, for effective utilization of radio resources, multiple frame transmission may be achieved so that a plurality of data frames are consecutively transmitted within a range of an SDMA transmission duration.

Figure 2:
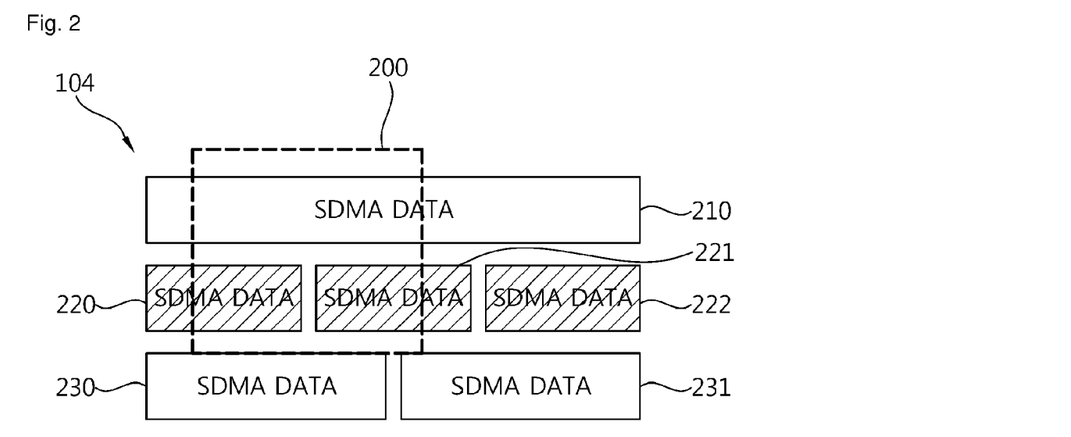
FIG. 2 shows an example of multiple frame transmission.

FIG. 2 shows an example of multiple frame transmission.

The SDMA data 104 of FIG. 1 may include SDMA data 210 to be transmitted to the STA_1 110 of FIG. 1, SDMA data 220, SDMA data 221, and SDMA data 222 to be transmitted to the STA_2 120, and SDMA data 230 and SDMA data 231 to be transmitted to the STA_3 130.

In the example of FIG. 2, the SDMA data frame 220 to be transmitted to the STA_2 120 has a shorter length than an SDMA transmission duration. Accordingly, the SDMA data 221 and the SDMA data 222 can be further transmitted consecutively during the SDMA transmission duration.

In a case where the SDMA data 210 is transmitted to the STA_1 110 and the SDMA data 220, the SDMA data 221, and the SDMA data 222 are transmitted to the STA_2 120 during the SDMA transmission duration in multiple frame transmission, whether synchronization is maintained between different pieces of SDMA data simultaneously transmitted to the respective STAs may need to be considered.

Figure 3:
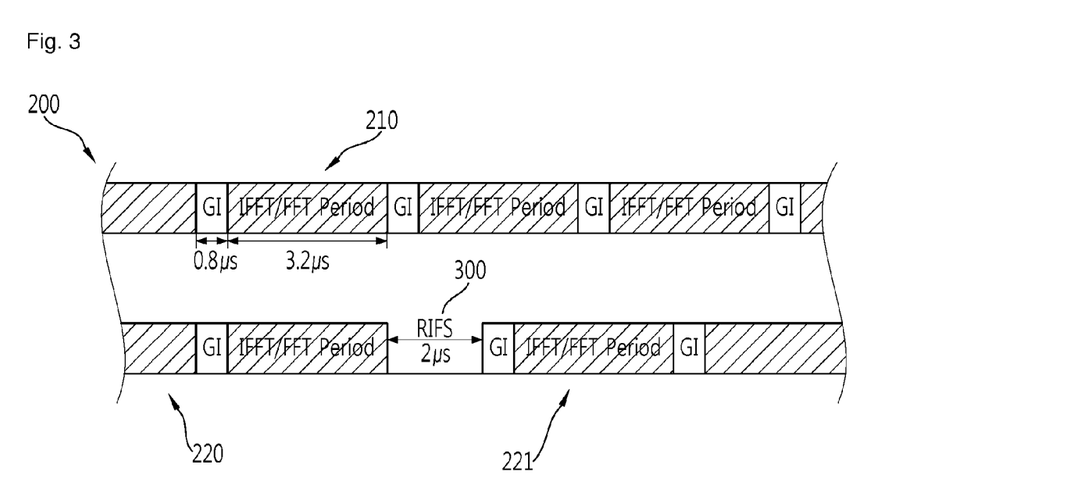
FIG. 3 shows a problem in which synchronization is not maintained between frames to be transmitted to respective STAs in SDMA transmission.

FIG. 3 shows a problem in which synchronization is not maintained between frames to be transmitted to respective STAs in SDMA transmission.

FIG. 3 is an enlarged view of a portion 200 of FIG. 2. A data frame includes an orthogonal frequency division multiplexing (OFDM) symbol (i.e., an inverse fast Fourier transform (IFFT)/fast Fourier transform (FFT) period of FIG. 3) and a guard interval (GI) for avoiding inter-symbol interference. According to the IEEE 802.11n standard, the IFFT/FFT period is 3.2 µs, and the GI is 0.8 µs. The IFFT/FFT period and the GI will be collectively referred to hereinafter as an OFDM symbol duration. That is, the OFDM symbol duration is 4.0 µs in the IEEE 802.11n standard.

In FIG. 3, transmission of SDMA data 210 to an STA_1 and transmission of SDMA data 220 to an STA_2 start simultaneously. Until transmission of the SDMA data 220 ends, synchronization between the STA_1 and the STA_2 is maintained since the OFDM symbol duration having the same length is repeated. Although not shown in FIG. 3, synchronization is also maintained as to SDMA data 230 transmitted to an STA_3.

However, if the end of transmission of the SDMA data 220 is subsequently followed by the start of transmission of SDMA data 221, synchronization between the SDMA data 210 and the SDMA data 221 is not maintained. This is because the SDMA data 221 transmitted subsequently to the SDMA data 220 is transmitted when an RIFS 300 elapses after the transmission of the SDMA data 220. According to the IEEE 802.11n standard, the RIFS 300 is 2 µs. Thereafter, synchronization between the SDMA data 210 and the SDMA data 221 is not maintained, which causes a problem in that an interference level of a signal increases in a receiving STA side and implementation complexity increases. Therefore, there is a need for a method of maintaining synchronization between data frames transmitted to respective STAs when multiple frames are transmitted in a WLAN system supporting SDMA transmission.

Figure 4:
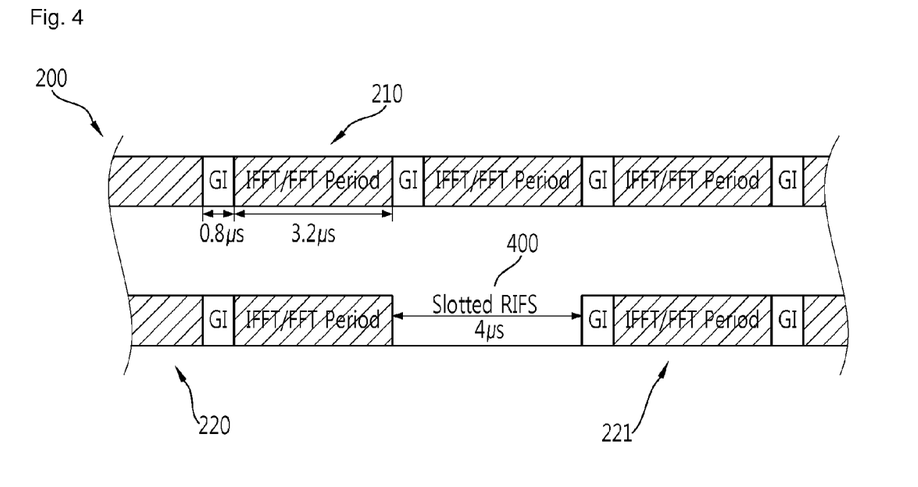
FIG. 4 shows an example of a slotted RIFS proposed in the present invention.

FIG. 4 shows an example of a slotted RIFS proposed in the present invention.

It is described above that multiple frame transmission has a problem in that synchronization is not maintained between frames transmitted to respective STAs. This problem occurs when an inter-frame space (IFS) is used as an RIFS in the multiple frame transmission. According to the IEEE 802.11n standard, the RIFS is 2 µs, which is not a multiple of an OFDM symbol duration.

To solve this problem, the present invention proposes to set the IFS to a multiple of the OFDM symbol duration. In this case, the IFS in the multiple frame transmission may be 0 µs, 4 µs, 8 µs, . . . , etc., which is a multiple of the OFDM symbol duration (i.e., 4 µs), rather than the RFIS (i.e., 2 µs) based on the IEEE 802.11n standard. A new IFS set to a multiple of the OFDM symbol duration (i.e., 4 µs) proposed in the present invention will be hereinafter referred to as a slotted RIFS. The term 'slotted RIFS' is arbitrarily named.

A slotted RIFS 400 is set to 4 µs in FIG. 4 which shows multiple frame transmission according to an embodiment of the present invention. Unlike in the example of FIG. 3, the slotted RIFS 400 of 4 µs is used as an IFS between SDMA data 220 and SDMA data 221, and as a result, synchronization can be maintained between the SDMA data 210 and the SDMA data 221.

The slotted RIFS proposed in the present invention can be used for multiple frame transmission in MU-MIMO. As to multiple frame transmission in SU-MIMO, an RIFS may also be used in addition to the slotted RIFS.

An AP may report to STAs whether the slotted RIFS is available. For example, a VHT operation information element including a slotted RIFS bit for reporting whether the slotted RIFS is available may be transmitted to the STAs. The VHT operation information element may be transmitted to the STA by being included in a probe response frame, a beacon frame, or the like based on the IEEE 802.11 standard. Upon receiving the probe response frame or the beacon frame, the STA can know whether the slotted RIFS is available according to the slotted RIFS bit of the VHT operation information element. When the slotted RIFS bit is set to 0, the slotted RIFS is not available, and in this case, an IFS may be set to an SIFS in multiple frame transmission. When conforming to the IEEE 802.11a/n standard, the SIFS is 16 µs, which is a multiple of an OFDM symbol duration (i.e., 4 μs). When the slotted RIFS bit is set to 1, the slotted RIFS is used as the IFS in the multiple frame transmission, and thus the multiple frame transmission occurs with an interval of the slotted RIFS.

Meanwhile, in the IEEE 802.11n standard, a short GI is optionally used to decrease an overhead. The short GI is 4 μs, and may be used in a data field according to setting of a field for indicating whether the short GI is available in a signal (SIG) field of a PLCP header. Since the short GI is used in the data field, when using the short GI, an OFDM symbol duration used in the PLCP header may differ from an OFDM symbol duration used in the data field. In other words, the OFDM symbol duration used in the PLCP header is 4 μs, whereas the OFDM symbol duration used in the data field is 3.6 μs.

In case of using the short GI, in order to maintain synchronization in multiple frame transmission, the short GI has to be used in frames transmitted to all STAs. When the short GI is used in a frame transmitted to the STA_1 in the example of FIG. 1, the short GI also has to be used in frames transmitted to the STA_2 and the STA_3. In other words, the same GI has to be used in all spatial streams in SDMA transmission. In addition, since the short GI is used only in the data field, multiple frame transmission is configured such that each frame has the same transmission start time. Therefore, when using the short GI, the use of the slotted RIFS proposed in the present invention as the IFS is not a solution for the problem of not being able to maintain synchronization in multiple frame transmission.

Figure 5:
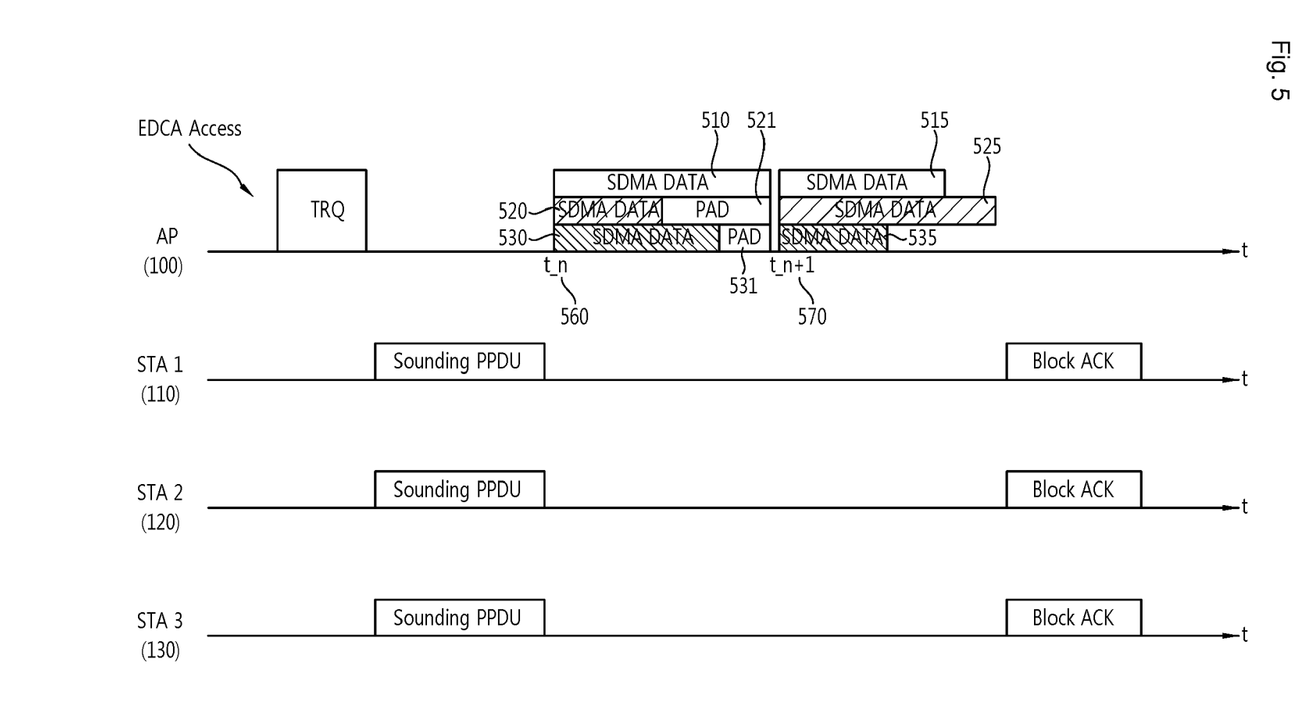
FIG. 5 shows an example of a synchronized multiple frame transmission method proposed in the present invention.

FIG. 5 shows an example of a synchronized multiple frame transmission method proposed in the present invention.

In the synchronized multiple frame transmission method proposed in the present invention, transmission is achieved by synchronizing a transmission start time of each frame in multiple frame transmission. In other words, when an AP transmits data frames 510 and 515 for multiple frame transmission to an STA_1 and transmits data frames 520 and 525 for multiple frame transmission to an STA_2, if transmission of the data frame 520 ends first, the next frame 525 is not transmitted after an RIFS or an SIFS elapses. The AP waits until the transmission of the data frame 510 ends, and starts to transmit the data frame 525 at the start of transmission of the data frame 515 to be transmitted after the data frame 510. That is, a transmission start time of the data frame 515 and a transmission start time of the data frame 525 are aligned to a t_n+1 570. In multiple frame transmission, transmission start times of respective frames are aligned to a t_n 560 and a t_n+1 570 as shown in FIG. 5. Transmission start times of frames to be transmitted to the STA_1, the STA_2, and the STA_3 are aligned to each other, and even if transmission for any one of the STAs ends first, a next frame is aligned again to the transmission start time after transmission of the remaining STAs ends. Accordingly, synchronization can be maintained between frames to be transmitted to respective STAs even if the short GI is used.

In the example of FIG. 5, to align transmission start times of the data frames 515, 525, and 535 to the t_n+1 570, null data padding can be used. In order to allow the data frame 510 to have the same transmission end time as the data frames 520 and 530 of which transmission ends before the data frame 510, a pad 521 is padded to the data frame 520, and a pad 531 is padded to the data frame 530. By using the null data padding, lengths of the frames to be transmitted to the STA_1, the STA_2, and the STA_3 can be adjusted to the same length.

As an example of the null data padding, the pad 521 and the pad 531 may be a zero bit stream including no data. As another example, an aggregate MAC protocol data unit (A-MPDU) may be used as the null data padding.

Figure 6:
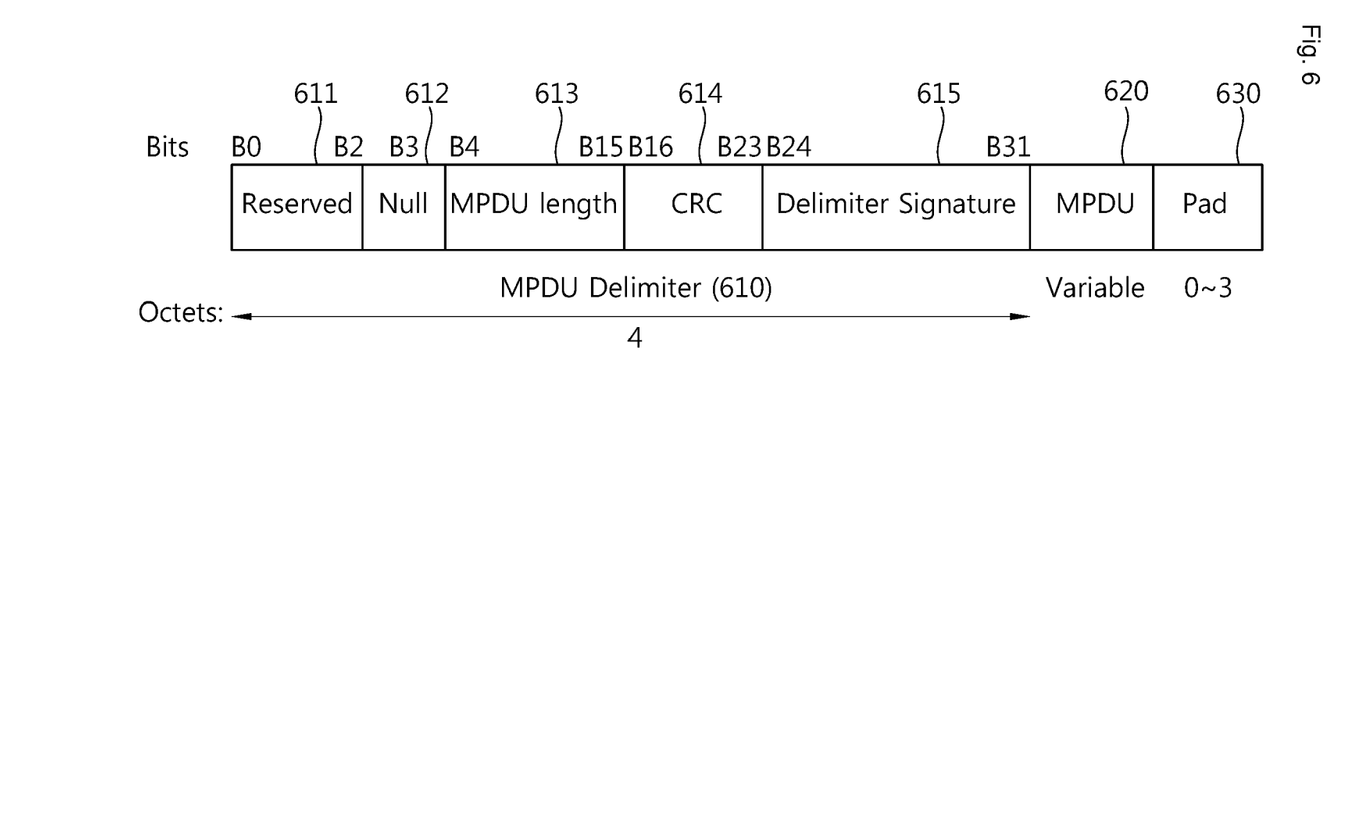
FIG. 6 shows an example of an A-MPDU subframe format used in null data padding according to an embodiment of the present invention.

FIG. 6 shows an example of an A-MPDU subframe format used in null data padding according to an embodiment of the present invention.

An A-MPDU subframe used in the null data padding according to the embodiment of the present invention includes an MPDU delimiter 610, an MPDU 620, and a pad 630. Except when it is the last A-MPDU subframe in an A-MPDU, the pad field 630 is appended to make each A-MPDU subframe a multiple of 4 octets in length. The MPDU delimiter 610 may be 4 octets in length. Table 1 shows an exemplary structure of the MPDU delimiter 610.

TABLE 1

| MPDU delimiter Field(610) | Size (bits) | Description |
| --- | --- | --- |
| Reserved(611) | 3 | |
| Null(612) | 1 | Indicating that follow-up MPDU is null data. |
| MPDU length(613) | 12 | Length of the MPDU in octets |
| CRC(614) | 8 | 8-bit CRC of the preceding 16-bits. |
| Delimiter Signature(615) | 8 | Pattern that may be used to detect an MPDU delimiter when scanning for a delimiter. The unique pattern may be set to the value 0x4E. |

The field names of Table 1 are arbitrarily named, and some of the fields may be added or omitted. A null field 612 may have 1 bit in length, and when this bit is set to 1, it may indicate that a follow-up MPDU is null data.

The AP aggregates MPDUs to be transmitted to a specific STA. If there is no more MPDUs to be aggregated or if an A-MPDU size is no longer able to be increased due to a limited A-MPDU size of a receiving STA, null padding is used to align a transmission start time. The AP sets the null bit of the A-MPDU subframe to 1, and transmits null data for follow-up MPDUs.

The STA receives the A-MPDU, and evaluates a null bit of each A-MPDU subframe of the A-MPDU. When the null bit is set to 1, it can be know that the follow-up A-MPDU subframe is null data, and thus the STA can immediately discard the follow-up A-MPDU subframe without storing it in a buffer.

Figure 7:
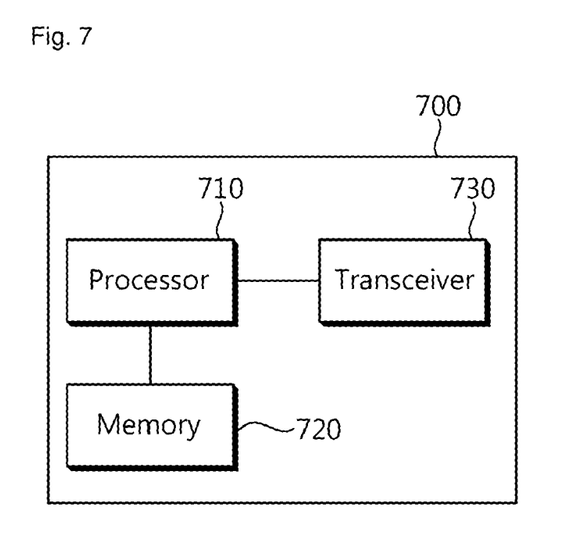
FIG. 7 is a block diagram showing an example of a wireless apparatus for implementing an embodiment of the present invention.

FIG. 7 is a block diagram showing an example of a wireless apparatus for implementing an embodiment of the present invention. A wireless apparatus 700 may be an AP or a non-AP STA.

The wireless apparatus 700 includes a processor 710, a memory 720, and a transceiver 730. The transceiver 730 transmits/receives a radio signal, and implements an IEEE 802.11 PHY layer. The transceiver 730 supports MU-MIMO transmission by using multiple antennas. The processor 710 is operationally coupled to the transceiver 730, and implements IEEE 802.11 MAC and PHY layers. When the processor 710 processes an operation of an AP in the aforementioned method, the wireless apparatus 700 is the AP. When the processor 710 processes an operation of an STA in the aforementioned method, the wireless apparatus 700 is the STA.

The wireless apparatus' MAC layer implemented in the processor 710 generates the aforementioned multiple frames, and generates an A-MPDU by aggregating the aforementioned A-MPDU subframes. The A-MPDU is transmitted to the transceiver 730 via a physical layer convergence protocol (PLCP) layer and a physical medium dependent (PMD) layer. The MAC and PHY layers supporting the frame transmission method in multiple channels of the present invention can be implemented by the processor 710 and the transceiver 730 by modularizing each layer.

The processor 710 and/or the transceiver 730 may include an application-specific integrated circuit (ASIC), a separate chipset, a logic circuit, a data processing unit, and/or a radio frequency (RF) unit for mutually converting a baseband signal and a radio signal. The memory 720 may include a read-only memory (ROM), a random access memory (RAM), a flash memory, a memory card, a storage medium, and/or other equivalent storage devices. When the embodiment of the present invention is implemented in software, the aforementioned methods can be implemented with a module (i.e., process, function, etc.) for performing the aforementioned functions. The module may be stored in the memory 720 and may be performed by the processor 710. The memory 720 may be located inside or outside the processor 710, and may be coupled to the processor 710 by using various well-known means.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

The invention claimed is:

1. A method of multi user multiple input multiple output (MIMO) communication in a wireless local area network (WLAN) system, the method being performed by a transmitting device and comprising:
   transmitting, by the transmitting device, a control frame to initiate channel sounding;
   receiving, by the transmitting device, a sounding frame including channel estimation information;
   generating, by the transmitting device, an Aggregate-Medium Access Control Protocol Data Unit (A-MPDU) including an A-MPDU subframe, the A-MPDU subframe including a Medium Access Control Protocol Data Unit (MPDU) delimiter field;
   selecting, by the transmitting device, a type of a guard interval to be applied to the A-MPDU among a short guard interval and a long guard interval by checking a capability of a receiving device, wherein, when the A-MPDU is generated for a plurality of receiving devices, the transmitting device checks whether all of the plurality of receiving devices support the short guard interval and selects the short guard interval only if all of the plurality of receiving devices support the short guard interval; and
   transmitting, by the transmitting device, the A-MPDU by using the selected guard interval,
   wherein the MPDU delimiter field includes a null field and an MPDU length field, the null field indicates a corresponding A-MPDU subframe is used to pad the A-MPDU, and the MPDU length field indicates a length of an MPDU of the corresponding A-MPDU subframe, and
   wherein the null field is a 1-bit information field and a value of the null field is set to '1' when the corresponding A-MPDU subframe is used to pad the A-MPDU.

2. The method of claim 1, wherein the MPDU delimiter field is 4 byte information and is directly followed by the MPDU, which is directly followed by a padding field.

3. The method of claim 1, wherein the MPDU delimiter field further includes a Cyclic Redundancy Check (CRC) field, which is directly followed by a delimiter signature field.

4. The method of claim 1, wherein each bit of the null data is set to '1'.

5. A transmitting device for multi user multiple input multiple output (MIMO) communication in a wireless local area network (WLAN) system, the transmitting device comprising:
   a processor configured to generate an Aggregate-Medium Access Control Protocol Data Unit (A-MPDU) including an A-MPDU subframe, the A-MPDU subframe including a Medium Access Control Protocol Data Unit (MPDU) delimiter field; and
   a radio unit configured to:
      transmit a control frame to initiate channel sounding,
      receive a sounding frame including channel estimation information,
      select a type of a guard interval to be applied to the A-MPDU among a short guard interval and a long guard interval by checking a capability of a receiving device, wherein, when the A-MPDU is generated for a plurality of receiving devices, the radio unit checks whether all of the plurality of receiving devices support the short guard interval and selects the short guard interval only if all of the plurality of receiving devices support the short guard interval, and
      transmit the A-MPDU by using the selected guard interval,
   wherein the MPDU delimiter field includes a null field and an MPDU length field, the null field indicates a corresponding A-MPDU subframe is used to pad the A-MPDU, and the MPDU length field indicates a length of an MPDU of the corresponding A-MPDU subframe, and wherein the null field is a 1-bit information field and a value of the null field is set to '1' when the corresponding A-MPDU subframe is used to pad the A-MPDU.

6. The transmitting device of claim 5, wherein the MPDU delimiter field is 4 byte information and is directly followed by the MPDU, which is directly followed by a padding field.

7. The transmitting device of claim 5, wherein the MPDU delimiter field further includes a Cyclic Redundancy Check (CRC) field, which is directly followed by a delimiter signature field.

8. The transmitting device of claim 5, wherein each bit of the null data is set to '1'.

* * * * *